United States Patent
North et al.

(10) Patent No.: US 11,092,986 B2
(45) Date of Patent: Aug. 17, 2021

(54) MULTI-FAN SEALED BOOST DOCK

(71) Applicant: Dell Products L.P., Round Rock, TX (US)

(72) Inventors: Travis North, Cedar Park, TX (US); Austin Shelnutt, Leander, TX (US); Philip Grossmann, Austin, TX (US); Chris Helberg, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 797 days.

(21) Appl. No.: 15/640,420

(22) Filed: Jun. 30, 2017

(65) Prior Publication Data

US 2019/0004551 A1  Jan. 3, 2019

(51) Int. Cl.
*G06F 1/16* (2006.01)
*G06F 1/20* (2006.01)
*G05D 23/19* (2006.01)

(52) U.S. Cl.
CPC ....... *G05D 23/1917* (2013.01); *G06F 1/1632* (2013.01); *G06F 1/203* (2013.01)

(58) Field of Classification Search
CPC .... G05D 23/1917; G06F 1/203; G06F 1/1632
USPC ........................................................ 454/184
See application file for complete search history.

(56) References Cited

U.S. PATENT DOCUMENTS

| | | | | |
|---|---|---|---|---|
| 3,991,819 A | * | 11/1976 | Clark | F24F 1/02 165/59 |
| 5,704,212 A | * | 1/1998 | Erler | F25B 21/04 361/679.41 |
| 5,768,101 A | * | 6/1998 | Cheng | G06F 1/1632 361/679.41 |
| 5,959,836 A | * | 9/1999 | Bhatia | G06F 1/203 361/679.41 |
| 5,969,939 A | * | 10/1999 | Moss | G06F 1/203 361/679.41 |
| 6,011,687 A | * | 1/2000 | Gluskoter | G06F 1/1632 361/679.41 |
| 6,094,347 A | * | 7/2000 | Bhatia | G06F 1/203 165/104.33 |

(Continued)

FOREIGN PATENT DOCUMENTS

JP    2008077436 A  *  4/2008  ........... H05K 5/0265

*Primary Examiner* — Kenneth J Hansen
*Assistant Examiner* — Phillip Decker
(74) *Attorney, Agent, or Firm* — Norton Rose Fulbright US LLP (57) ABSTRACT

Performance of a system may be boosted with a boost dock that seals fan interfaces to improve airflow through an information handling system. An apparatus may include a first port configured to seal a first interface between the apparatus and an information handling system. The apparatus may also include a first blower configured to receive ambient air as cool intake air and to blow the cool intake air into the information handling system through the first interface sealed by the first port. The apparatus may further include a second blower configured to receive warm exhaust air from the information handling system through the first interface sealed by the first port and to blow the warm exhaust air out of the apparatus. A method may include steps of sealing a first interface, receiving ambient air, blowing cool intake air, receiving warm exhaust air, and blowing warm exhaust air.

20 Claims, 10 Drawing Sheets

(56) References Cited

U.S. PATENT DOCUMENTS

| | | | | |
|---|---|---|---|---|
| 6,219,233 B1 * | 4/2001 | Moore | G06F 1/1632 | 361/679.47 |
| 6,259,601 B1 * | 7/2001 | Jaggers | G06F 1/1632 | 165/104.33 |
| 6,342,687 B1 * | 1/2002 | Sukhman | B23K 26/1462 | 219/121.6 |
| 6,353,536 B1 * | 3/2002 | Nakamura | G06F 1/1632 | 361/679.41 |
| 6,453,378 B1 * | 9/2002 | Olson | G06F 1/1632 | 361/679.41 |
| 6,522,535 B1 * | 2/2003 | Helot | G06F 1/1632 | 165/104.34 |
| 6,542,360 B2 * | 4/2003 | Koizumi | G06F 1/1632 | 165/80.3 |
| 6,574,102 B2 * | 6/2003 | Usui | G06F 1/1632 | 165/104.33 |
| 6,687,123 B2 * | 2/2004 | Kitahara | G06F 1/1632 | 165/121 |
| 6,822,856 B2 * | 11/2004 | Fujiwara | G06F 1/203 | 165/185 |
| 6,826,047 B1 * | 11/2004 | Chen | G06F 1/203 | 165/185 |
| 6,837,057 B2 * | 1/2005 | Pokharna | G06F 1/203 | 361/679.41 |
| 6,845,008 B2 * | 1/2005 | Pokharna | G06F 1/203 | 165/104.33 |
| 7,380,143 B2 * | 5/2008 | Gold | G06F 1/1632 | 361/679.41 |
| 7,472,215 B1 * | 12/2008 | Mok | G06F 1/203 | 710/304 |
| 7,630,201 B2 * | 12/2009 | Asahi | G05D 23/19 | 165/104.33 |
| 7,694,057 B2 * | 4/2010 | Mok | G06F 1/1632 | 710/304 |
| 7,702,837 B2 * | 4/2010 | Mok | G06F 1/1632 | 710/304 |
| 7,872,864 B2 * | 1/2011 | Mongia | G06F 1/203 | 361/695 |
| 8,000,099 B2 * | 8/2011 | Parker | G06F 1/1632 | 174/16.1 |
| 8,320,121 B2 * | 11/2012 | Bisson | H05K 7/20736 | 361/679.5 |
| 8,619,419 B2 * | 12/2013 | Zimmermann | G06F 1/203 | 361/679.41 |
| 8,705,233 B2 * | 4/2014 | Rehmann | G06F 1/203 | 361/679.49 |
| 8,724,314 B2 * | 5/2014 | Pais | G06F 1/203 | 361/679.46 |
| 8,926,414 B1 * | 1/2015 | Kirkpatrick | H05K 7/20136 | 361/679.41 |
| 9,226,427 B2 * | 12/2015 | Liu | H05K 7/20145 | |
| 9,280,179 B2 * | 3/2016 | Morrison | G06F 1/1626 | |
| 9,395,773 B1 * | 7/2016 | Huang | H05K 7/20181 | |
| 10,004,164 B2 * | 6/2018 | Leigh | G06F 1/20 | |
| 10,412,560 B2 * | 9/2019 | Miele | G06F 1/1613 | |
| 10,416,734 B2 * | 9/2019 | Casparian | G06F 1/203 | |
| 10,481,656 B2 * | 11/2019 | Casparian | G06F 1/206 | |
| 2013/0337735 A1 * | 12/2013 | Peterson | F04D 29/582 | 454/184 |
| 2014/0043750 A1 * | 2/2014 | Calderone | G06F 1/1632 | 361/679.41 |
| 2014/0098486 A1 * | 4/2014 | Davis | G06F 1/1607 | 361/679.41 |
| 2017/0168531 A1 * | 6/2017 | Casparian | G06F 1/1632 | |
| 2017/0277232 A1 * | 9/2017 | Yamashita | G05D 23/1917 | |
| 2018/0091987 A1 * | 3/2018 | Miele | G06F 1/203 | |

* cited by examiner

MULTI-FAN SEALED BOOST DOCK

FIELD OF THE DISCLOSURE

The instant disclosure relates to system performance boosting. More specifically, portions of this disclosure relate to boosting performance of a system with a boost dock that seals fan interfaces to improve airflow through the system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Factors evaluated to determine the value of information handling systems include at least the performance of the information handling systems and the size of the information handling systems. Desired properties tend to be high performance and small size. Performance and size, however, tend to create a trade-off because higher performance typically requires a larger size. One of the reasons for the trade-off is that increasing performance conventionally results in more heat dissipation, which requires increasing the cooling of and overall airflow through the information handling systems. To provide increased cooling of and overall airflow through an information handling system more fans or more power fans are included within the information handling system. Increasing performance thus also generally results in an increase in size of the information handling system.

SUMMARY

The performance of an information handling system may be improved without increasing the size of the information handling system through the use of a boost dock that seals fan interfaces to improve cooling of and airflow through the information handling system. When the information handling system is in contact with the apparatus (the performance-boosting dock), the apparatus may seal certain interfaces between the apparatus and the information handling system and make use of the pressure head, developed as a result of the sealing, to improve cooling of and airflow through the information handling system. When the information handling system is attached to the boost dock, the performance may increase in accordance with the better cooling of the system. Accordingly, the larger blowers used to increase performance of the information handling system may be located within the apparatus and not within the information handling system. The information handling system may therefore include smaller blowers/fans that are sufficient to meet a certain performance metric when the information handling system is not docked. As a result, the overall size of the portable information handling system may be maintained or reduced while performance may be improved when needed by coupling the information handling system to the apparatus that provides the enhanced cooling of and airflow through the information handling system. Accordingly, the apparatus allows an information handling system to have both high performance and small size and therefore reduces the effect of the performance-size trade-off on an information handling system configured to couple to an apparatus of this disclosure.

According to one embodiment, an apparatus may include a first port configured to seal a first interface between the apparatus and an information handling system. The apparatus may also include a first blower configured to receive ambient air as cool intake air and to blow the cool intake air into the information handling system through the first interface sealed by the first port. The apparatus may further include a second blower configured to receive warm exhaust air from the information handling system through the first interface sealed by the first port and to blow the warm exhaust air out of the apparatus.

According to another embodiment, a method may include sealing, with a first port, a first interface between an apparatus and an information handling system. The method may also include receiving, with a first blower, ambient air as cool intake air. The method may further include blowing, with the first blower, the cool intake air into the information handling system through the first interface sealed by the first port. The method may also include receiving, with a second blower, warm exhaust air from the information handling system through the first interface sealed by the first port. The method may further include blowing, with the second blower, the warm exhaust air out of the apparatus.

In some embodiments, a portable information handling system may be configured with components that can change performance profiles in accordance with the presence of the boost dock. For example, a processor may have a scalable power consumption. The power consumption may be capped at a first power limit when the information handling system is detached from the boost dock. When attached to the boost dock, the power consumption for the processor may be increased to a second power limit, or the power limit removed from the processor. An embedded controller in the information handling system may control the processor to adjust the power consumption and/or apply power limits. The embedded controller may determine the presence of the boost dock by detecting a connection between the boost dock and the information handling system or by detecting a decrease in the temperatures of components in the information handling system.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed systems and methods, reference is now made to the following descriptions taken in conjunction with the accompanying drawings. In the appended figures, similar figures, components, or features may have the same reference label. Further, various components of the same type may be distinguished by following the reference label with a second label that distinguishes among the similar components. If just the first reference label is used in the specification, the description is applicable to any one of the similar components having the same first reference label irrespective of the second reference label.

DETAILED DESCRIPTION

Figure 1A:
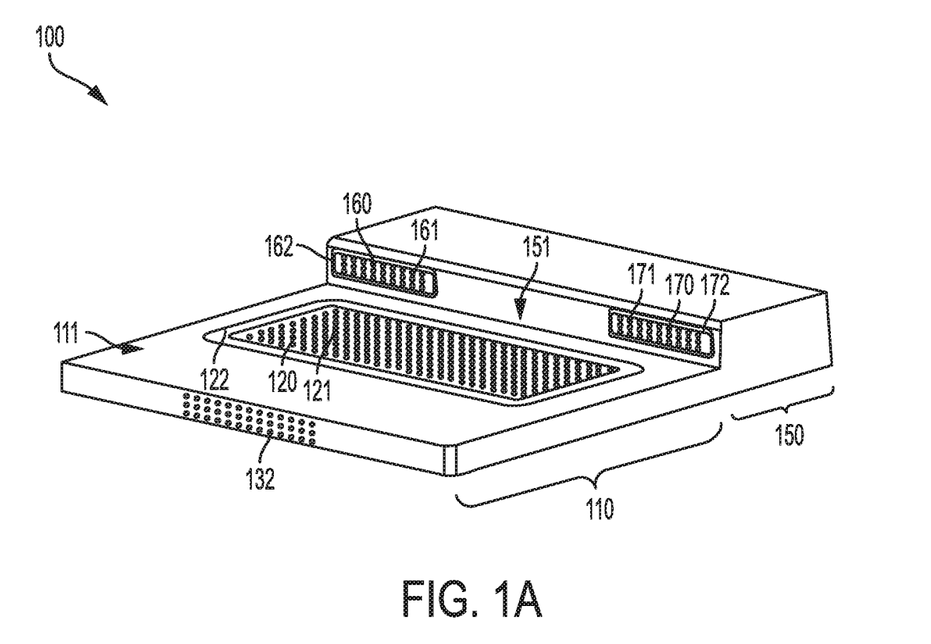
FIG. 1A is a perspective view of an apparatus for boosting performance of an information handling system according to some embodiments of the disclosure.
Figure 1B:
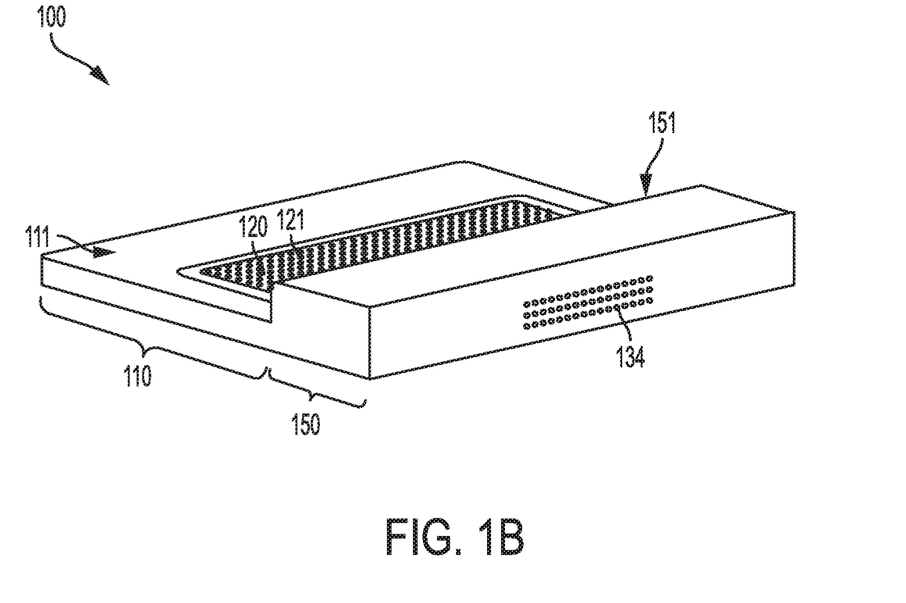
FIG. 1B is a second perspective view of an apparatus for boosting performance of an information handling system according to some embodiments of the disclosure.
Figure 1C:
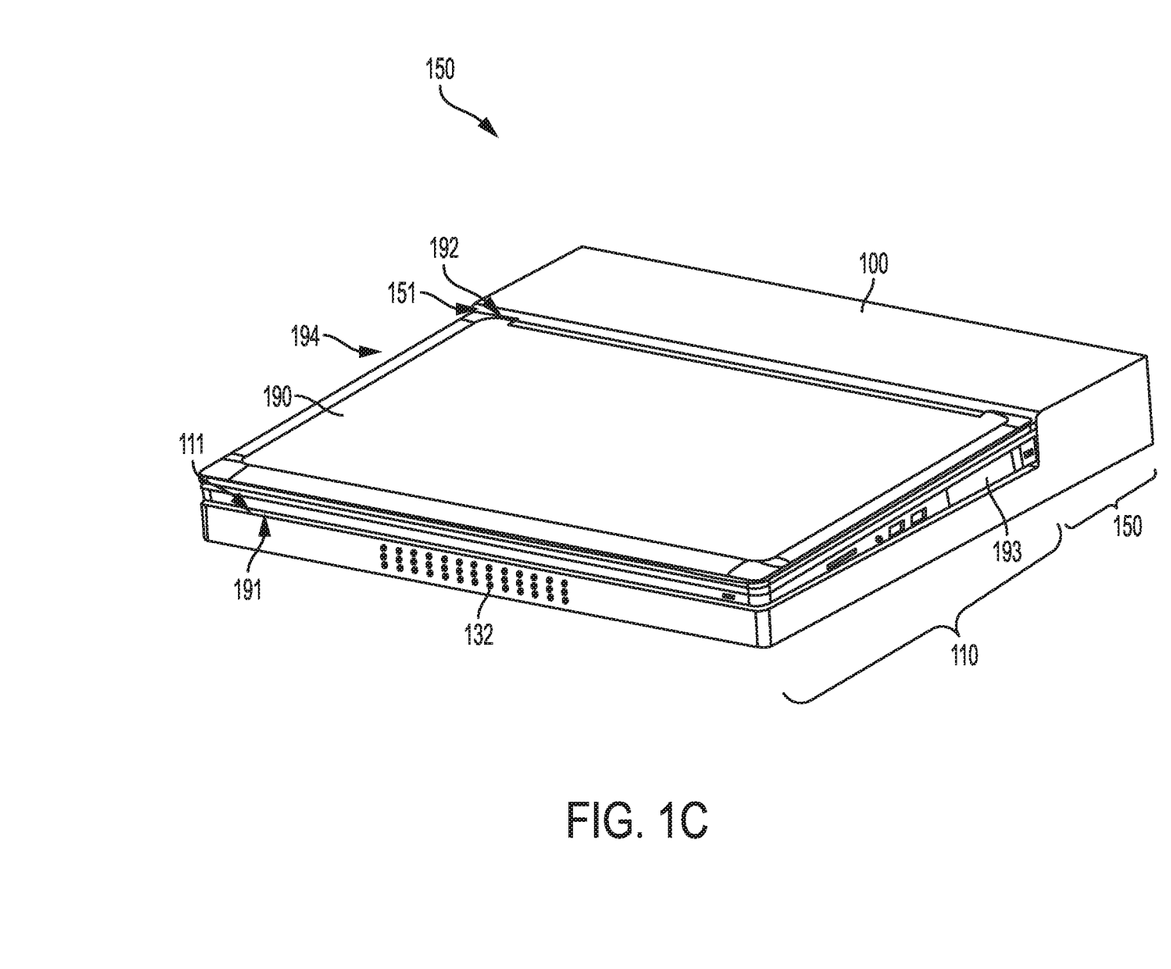
FIG. 1C is a perspective view of a coupling of an information handling system to an apparatus for boosting performance of the information handling system according to some embodiments of the disclosure.

FIG. 1A is a perspective view of an apparatus for boosting performance of an information handling system according to some embodiments of the disclosure; and FIG. 1B is a second perspective view of the apparatus according to some embodiments of the disclosure. FIG. 1C illustrates a coupling of an information handling system to an apparatus for boosting performance of the information handling system according to some embodiments of the disclosure. Apparatus 100 may be referred to as a dock, a docking station, a computer dock, or the like. In some embodiments, the apparatus 100 may also function as a port replicator by providing additional ports for use with an information handling system. For example, the apparatus 100 may include USB ports, display ports (e.g., HDMI and/or DisplayPort), power connectors, audio plugs, and/or the like.

Apparatus 100 may include a first portion 110 and a second portion 150. First portion 110 may include a first surface 111 that is configured to interface with a bottom surface 191 of an information handling system 190. FIG. 1A illustrates one embodiment of first surface 111 and FIG. 1C illustrates how first surface 111 may interface with bottom surface 191 of information handling system 190. Second portion 150 may include a second surface 151 that is configured to interface with a back surface 192 of an information handling system 190. FIG. 1A illustrates one embodiment of second surface 151 and FIG. 1C illustrates how second surface 151 may interface with back surface 192 of information handling system 190.

Ports may be openings that allow airflow through the surfaces of the apparatus 100 to an information handling system. A first port 120 may be located on first surface 111. First port 120 may include a vent interface 121 that is configured to allow air to pass between apparatus 100 and information handling system 190. A second port 160 and a third port 170 may be located on second surface 151. Second port 160 may include a vent interface 161 that is configured to allow air to pass between apparatus 100 and information handling system 190, and third port 170 may include a vent interface 171 that is configured to allow air to pass between apparatus 100 and information handling system 190.

One or more of ports 120, 160, and 170 may be configured to seal the interfaces they include. For example, first port 120 may be configured to seal interface 121 between apparatus 100 and information handling system 190, second port 160 may be configured to seal interface 161 between apparatus 100 and information handling system 190, and third port 170 may be configured to seal interface 171 between apparatus 100 and information handling system 190. In some embodiments, such as the embodiments illustrated in FIG. 1, to seal the interfaces, each of ports 120, 160, and 170 may include a gasket that surrounds the interface. For example, first port 120 may include gasket 122, second port 160 may include gasket 162, and third port 170 may include gasket 172. According to certain embodiments, gaskets 122, 162, and 172 may be made from a material that includes rubber or foam. In another embodiment, to seal the interfaces, each of ports 120, 160, and 170 may represent locations where the apparatus and information handling system have been specifically designed to couple to one another in a manner that seals the vent interfaces between the apparatus and the information handling system.

Figure 1D:
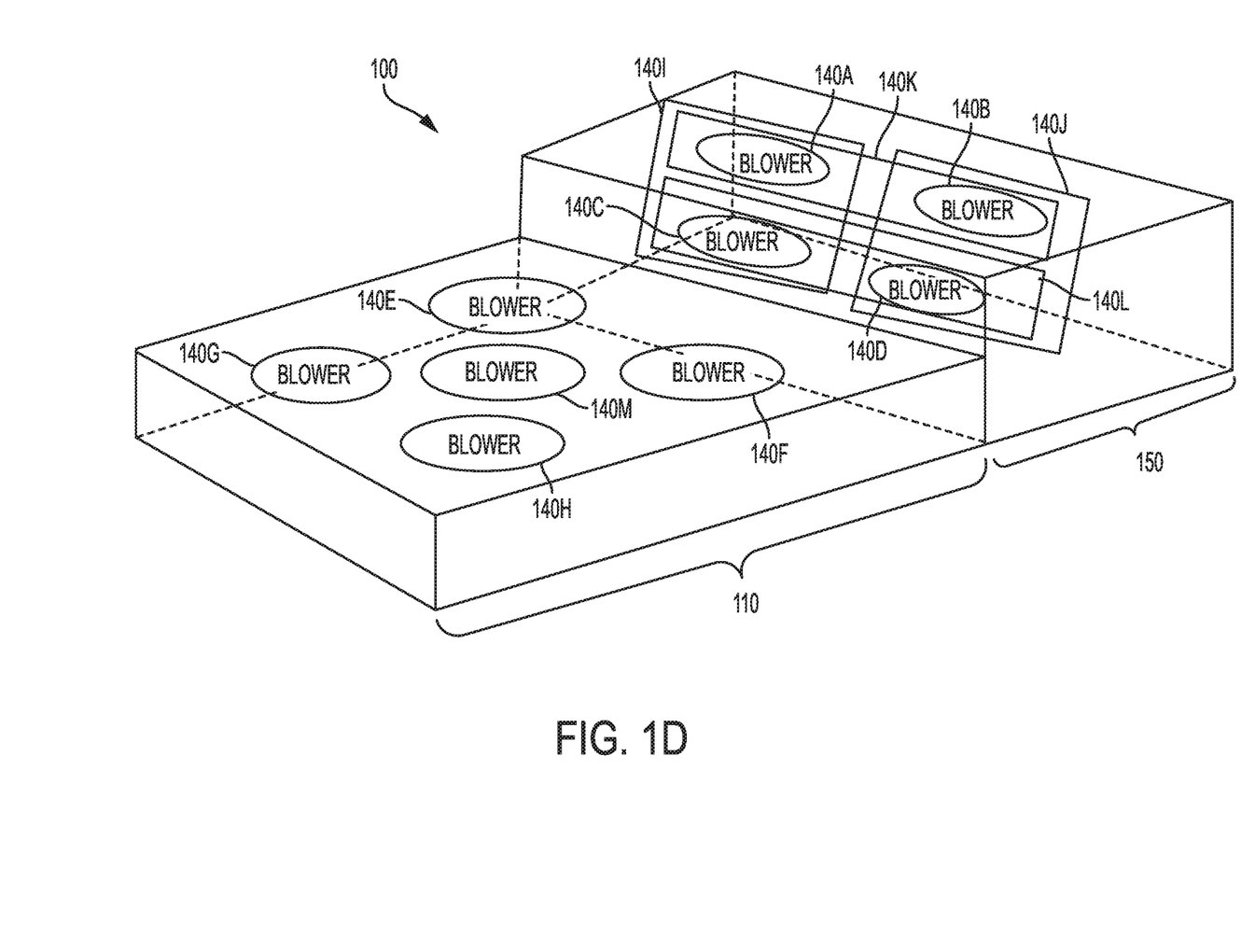
FIG. 1D is an interior view illustrating example locations of blowers within an apparatus for boosting performance of an information handling system according to some embodiments of the disclosure.

Vents may be openings that allow airflow through the surfaces of the apparatus 100. To receive cool ambient intake air, apparatus 100 may include inlet vent 132, as illustrated in FIGS. 1A and 1C. Additionally, to blow warm exhaust air out of apparatus 100, apparatus 100 may include outlet vent 134, as illustrated in FIG. 1B. Apparatus 100 may include one or more blowers configured to propel air through apparatus 100 and/or into or out of information handling system 190. FIG. 1D is an interior view illustrating locations of blowers within an apparatus for boosting performance of an information handling system according to some embodiments of the disclosure. In FIG. 1D, all aspects other than the apparatus boundaries and the blowers of apparatus 100 are not illustrated in order to focus FIG. 1D on the possible locations of the blowers within apparatus 100. A blower 140 may be located anywhere within apparatus 100. For example, one or more blowers 140 may be located in first portion 110 of apparatus 100 and/or one or more blowers 140 may be located in second portion 150 of apparatus 100. The blowers 140 illustrated in FIG. 1D are not intended to represent an approximate size of a blower in relation to apparatus 100. Instead, blowers 140 in FIG. 1D are illustrated only to illustrate the approximate areas where blowers may be located within apparatus 100. For example, blowers 140I and 140J illustrate that blowers may be larger blowers placed side-by-side in second portion 150. As another example, blowers 140K and 140L illustrate that blowers may be larger and stacked in second portion 150. The locations illustrated in FIG. 1D for the blowers 140 are only examples. Blowers may be located elsewhere in apparatus 100 at locations not approximately the same as an area illustrated in FIG. 1D. For example, blower 140M illustrates that a blower may be located in the center of first portion 110.

Figure 2A:
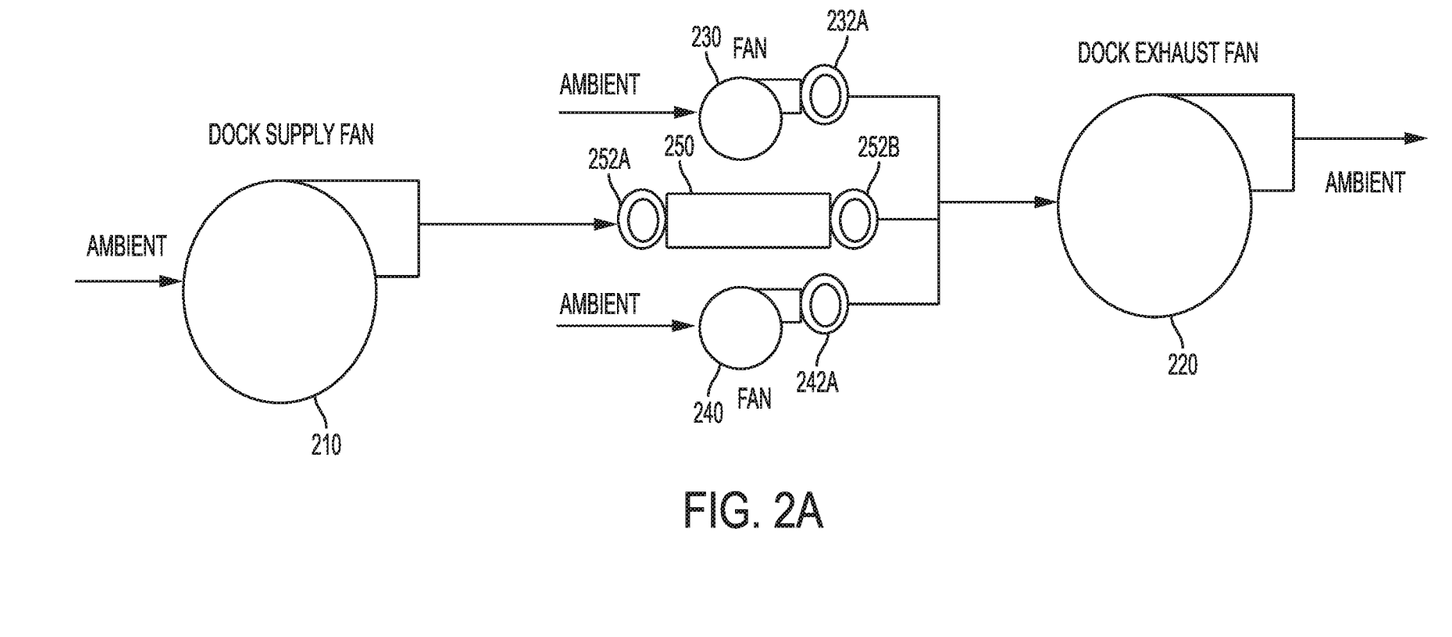
FIG. 2A is a block diagram illustrating functionality of some internal components of an apparatus for boosting performance of an information handling system according to some embodiments of the disclosure.
Figure 2B:
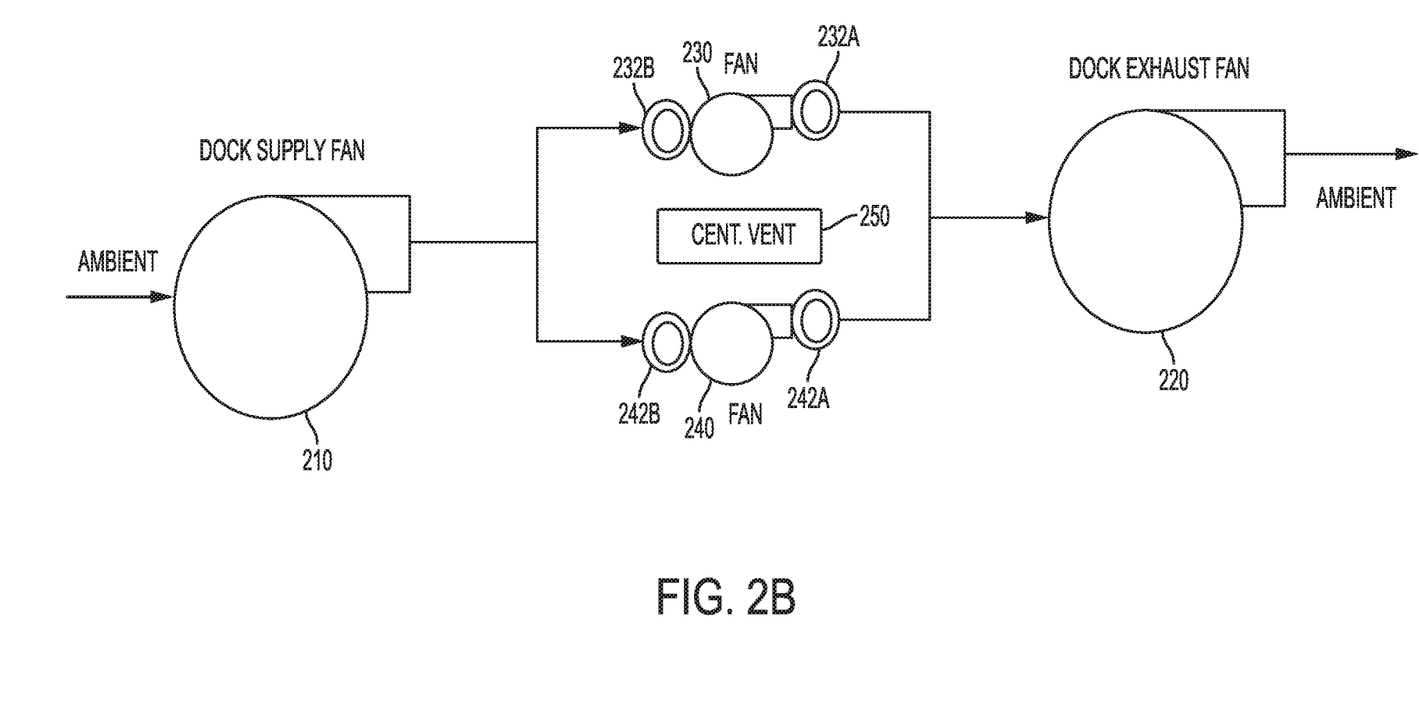
FIG. 2B is another block diagram illustrating functionality of some internal components of an apparatus for boosting performance of an information handling system according to some embodiments of the disclosure.
Figure 2C:
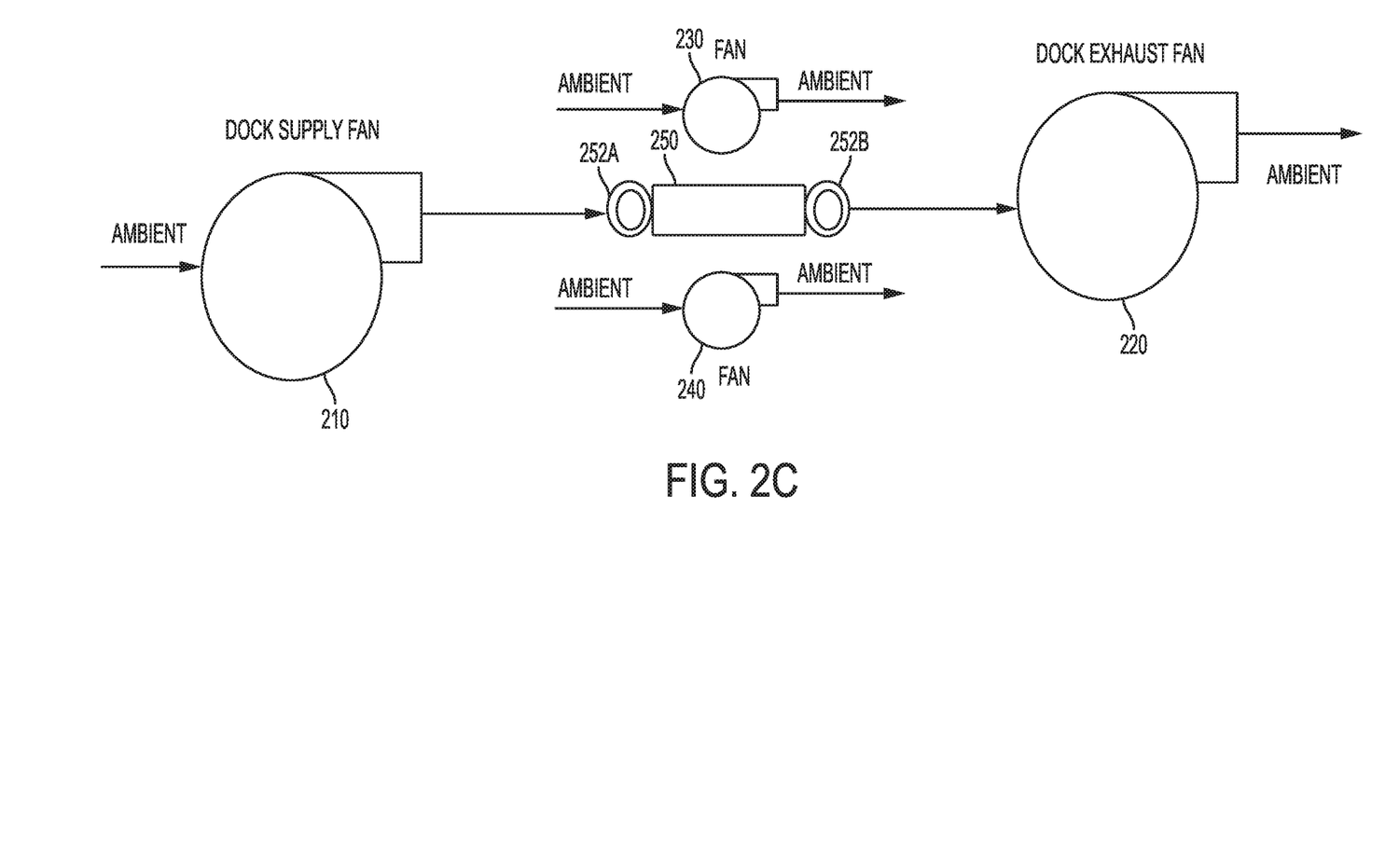
FIG. 2C is yet another block diagram illustrating functionality of some internal components of an apparatus for boosting performance of an information handling system according to some embodiments of the disclosure.

The airflow into, through, and out of apparatus 100 may be guided by ductwork within apparatus 100. FIGS. 2A-2C illustrate different embodiments of ductwork that may be included within apparatus 100. In particular, the ductwork illustrated in FIGS. 2A-2C may configure the blowers within apparatus 100, such as any of blowers 140 illustrated in FIG. 1D, to receive and/or blow air from and/or to the various interfaces to an information handling system and/or to the ambient environment. The blowers may be located anywhere within apparatus 100, as illustrated in FIG. 1D. In FIGS. 2A-2C, examples of ductwork that may be used to guide air are illustrated by lines and arrow. The ductwork illustrated in FIGS. 2A-2C is provided only for illustrating examples of ductwork paths. One of skill in the art would readily recognize that additional or less ductwork paths may be included without deviating from the spirit or scope of this disclosure.

FIG. 2A is a block diagram illustrating functionality and some internal components of an apparatus for boosting performance of an information handling system according to some embodiments of the disclosure. In particular, FIG. 2A illustrates ductwork within apparatus 100 according to some embodiments of the disclosure to configure the apparatus to receive and/or blow air from and/or to the various interfaces to an information handling system and/or to the ambient environment. In FIG. 2A, apparatus 100 may include supply fan 210 (e.g., a blower) and exhaust fan 220 (e.g., a blower). As mentioned above, blowers 210 and 220 may be located anywhere within apparatus 100, such as any of the locations illustrated in FIG. 1D. Fan 230 and fan 240 represent fans within an information handling system, such as information handling system 190 illustrated in FIG. 1C. For example, fan 230 may be a fan within an information handling system configured to cool a central processing unit (CPU) of the information handling system, and fan 240 may be a fan within an information handling system configured to cool a graphics processing unit (GPU) of the information handling system. Element 250 may represent a central vent of apparatus 100 and may correspond to port 120 illustrated in FIGS. 1A and 1B.

FIG. 2A also illustrates sealed interfaces between components of apparatus 100, such as blowers 210 and 220 and vent 250, and components of an information handling system, such as fans 230 and 240. In particular, sealing element 252 may represent the sealing of vent 250, or similarly the sealing of port 120 illustrated in FIGS. 1A and 1B. Although sealing element 252 is illustrated with two sealing elements, 252A and 252B, both sealing element 252A and 252B may correspond to the same sealing of the interface 121 included in port 120. For example, sealing element 252 may correspond to gasket 122 illustrated in FIGS. 1A and 1B. Two separate sealing elements are illustrated simply to illustrate that vent 250 may be sealed as air is blown through vent 250 with blower 210 and that vent 250 may also be sealed as air is exhausted through vent 250 with blower 220. In some embodiments, however, sealing elements 252A and 252B may indeed represent two separate sealing elements, such as in an embodiment in which one half of vent 250 is sealed with a sealing element 252A and is dedicated to allowing air to pass from blower 210 into information handling system 190 and the other half of vent 250 is sealed with another sealing element 252B and is dedicated to allowing air to pass out of information handling system 190 and to blower 220. Such an embodiment in which sealing elements 252A and 252B may represent two separate sealing elements may occur when interface 121 illustrated in FIGS. 1A and 1B is divided into two separate interfaces sealed by two different sealing elements.

Sealing element 232A may represent the sealing of an interface through which exhaust air may be received by a blower 220 of apparatus 100 from information handling system 190. For example, as illustrated in FIG. 2A, fan 230 of information handling system 190 may be configured to blow warm exhaust air out, or allow warm exhaust air to flow, through an interface between blower 220 of apparatus 100 and fan 230 of information handling system 190 that is sealed with sealing element 232A. Accordingly, in some embodiments sealing element 232A may represent a sealing of an outlet of fan 230. In some embodiments, sealing element 232A may correspond to gasket 162 or gasket 172 sealing interface 161 or interface 171, respectively. As illustrated in FIG. 2A, no sealing element may be located at the inlet of fan 230. Therefore, in some embodiments, fan 230 may be configured to receive ambient air as cool intake air to cool a CPU within information handling system 190. For example, referring back to FIG. 1A, information handling system 190 may include a vent interface 193 that is open to the ambient environment. Apparatus 100 may be configured to not cover vent interface 193 or impede the free flow of ambient air into vent interface 193 such that ambient air is allowed to enter vent interface 193 between fan 230 of information handling system 190 and the ambient environment without the air first having to enter first blower 210 or second blower 220.

Similarly, sealing element 242A may represent the sealing of another interface through which exhaust air may be received by a blower 220 of apparatus 100 from information handling system 190. For example, as illustrated in FIG. 2A, fan 240 of information handling system 190 may be configured to blow warm exhaust air out, or allow warm exhaust air to flow, through an interface between blower 220 of apparatus 100 and fan 240 of information handling system 190 that is sealed with sealing element 242A. Accordingly, in some embodiments sealing element 242A may represent a sealing of an outlet of fan 240. In some embodiments, sealing element 242A may correspond to gasket 162 or gasket 172 sealing interface 161 or interface 171, respectively. As illustrated in FIG. 2A, no sealing element may be located at the inlet of fan 240. Therefore, in some embodiments, fan 240 may be configured to receive ambient air as cool intake air to cool a CPU within information handling system 190. For example, referring back to FIG. 1A, information handling system 190 may include a vent interface 194 that is open to the ambient environment, similar to the manner in which vent interface 193 of information handling system 100 is open to the ambient environment. Apparatus 100 may be configured to not cover vent interface 194 or impede the free flow of ambient air into vent interface 194 such that ambient air is allowed to enter vent interface 194 between fan 240 of information handling system 190 and the ambient environment without the air first having to enter first blower 210 or second blower 220. Accordingly, as illustrated in FIG. 1C, apparatus 100 may be configured to allow ambient air to enter at least one vent of the information handling system 190, such as vent interface 193 and/or vent interface 194, without first entering blower 210 or blower 220.

As illustrated in FIG. 2A, blower 210 may be configured to receive ambient air as cool intake air. For example, blower 210, located within apparatus 100, may be configured to receive the ambient cool intake air through inlet vent 132 and internal ductwork of apparatus 100. In addition, blower 210 may be configured to blow the cool intake air into the information handling system through the first interface sealed by the first port. For example, blower 210 may be configured to blow the received cool intake air to information handling system 190 through internal ductwork of apparatus 100 and through interface 121 of first port 120 that is sealed by gasket 122.

Blower 220 may be configured to receive warm exhaust air from the information handling system through the first interface sealed by the first port. For example, blower 220 may be configured to receive warm exhaust air from the information handling system 190 through interface 121 of first port 120 that is sealed by gasket 122 and through internal ductwork of apparatus 100. In addition, blower 220 may be configured to blow warm exhaust air out of apparatus 100. For example, blower 220 may be configured to blow warm exhaust air through internal ductwork of apparatus 100 and out of apparatus 100 via outlet vent 134.

As illustrated in FIG. 2A, blower 220 may also be configured to receive warm exhaust air from the information handling system through the second interface sealed by the second port and through the third interface sealed by the third port. For example, blower 220 may be configured to receive warm exhaust air from the information handling system 190 through interface 161 of second port 160 that is sealed by gasket 162, through interface 171 of third port 170 that is sealed by gasket 172, and through internal ductwork of apparatus 100.

FIG. 2B is another block diagram illustrating functionality and some internal components of an apparatus for boosting performance of an information handling system according to some embodiments of the disclosure. In particular, FIG. 2B, like FIG. 2A, illustrates ductwork within apparatus 100 according to some embodiments of the disclosure to configure the apparatus to receive and/or blow air from and/or to the various interfaces to an information handling system and/or to the ambient environment. In the embodiment illustrated in FIG. 2B, blowers 210 and 220 may not be configured to blow air towards, or receive air from, the central vent 250. For example, with reference to FIG. 1, blowers 210 and 220 may not be configured to blow air towards, or receive air from, the interface 121 of first port 120. Therefore, in an embodiment in which apparatus 100 is configured in accordance with the embodiment illustrated in FIG. 2B, there may not be ductwork within apparatus 100 to guide air between blowers 210 and 220 and central vent 250, represented, at least in part, by first port 120 in FIGS. 1A and 1B. However, as illustrated in FIG. 2B, central vent 250 may still be included in the apparatus. In other words, with reference to FIGS. 1A and 1B, first port 120 illustrated in FIGS. 1A and 1B may still be included in an apparatus 100 configured in accordance with the embodiment illustrated in FIG. 2B, although with no internal ductwork between blowers 210 and 220 and first port 120. Instead, central vent 250, or similarly first port 120, may be used to implement other aspects of apparatus 100.

The embodiment illustrated in FIG. 2B, like the embodiment illustrated in FIG. 2A, also includes sealing elements 232A and 242A as described with reference to FIG. 2A. In addition, the embodiment illustrated in FIG. 2B also includes sealing elements 232B and 242B. Sealing element 232B may represent the sealing of an interface through which intake air may be blown by a blower 210 of apparatus 100 into information handling system 190. For example, as illustrated in FIG. 2B, fan 230 of information handling system 190 may be configured to receive cool intake air, or allow cool intake air to flow, through an interface between blower 210 of apparatus 100 and fan 230 of information handling system 190 that is sealed with sealing element 232B. Accordingly, in some embodiments sealing element 232B may represent a sealing of an inlet of fan 230. In some embodiments, sealing element 232B may correspond to gasket 162 or gasket 172 sealing interface 161 or interface 171, respectively.

Sealing element 242B may represent the sealing of an interface through which intake air may be blown by a blower 210 of apparatus 100 into information handling system 190. For example, as illustrated in FIG. 2B, fan 240 of information handling system 190 may be configured to receive cool intake air, or allow cool intake air to flow, through an interface between blower 210 of apparatus 100 and fan 240 of information handling system 190 that is sealed with sealing element 242B. Accordingly, in some embodiments sealing element 242B may represent a sealing of an inlet of fan 240. In some embodiments, sealing element 242B may correspond to gasket 162 or gasket 172 sealing interface 161 or interface 171, respectively.

Although sealing elements 232 and 242 are illustrated in FIG. 2B as including two separate sealing elements, e.g., sealing element 232 including sealing elements 232A and 232B and sealing element 242 including sealing elements 242A and 242B, both sealing elements, 232A and 232B for sealing element 232 (or 242A and 242B for sealing element 242), may correspond to the same sealing of an interface, such as interface 161 included in port 160 or interface 171 included in port 170. For example, sealing element 232 may correspond to gasket 162 or 172 illustrated in FIGS. 1A and 1B and sealing element 242 may correspond to the other gasket, such as gasket 172 or 162, illustrated in FIGS. 1A and 1B. Two separate sealing elements are illustrated for each of sealing elements 232 and 242 simply to illustrate that a vent interface, such as either vent interface 161 or vent interface 171, may be sealed as air is blown through the vent interface with blower 210 and that the same vent interface may also sealed as air is exhausted through the vent interface with blower 220. In some embodiments, however, sealing elements 232A and 232B, or similarly sealing elements 242A and 242B, may indeed represent two separate sealing elements, such as in an embodiment in which one half of a vent interface sealed by sealing element 232 (or 242) is sealed with a sealing element 232B (or 242B) and is dedicated to allowing air to pass from blower 210 into information handling system 190 and the other half of the vent is sealed with another sealing element 232A (or 242A) and is dedicated to allowing air to pass out of information handling system 190 and to blower 220. Such an embodiment in which sealing elements 232A and 232B, or similarly sealing elements 242A and 242B, may represent two separate sealing elements may occur when a vent interface, such as either of vent interfaces 161 or 171 illustrated in FIGS. 1A and 1B, is divided into two separate interfaces sealed by two different sealing elements.

As illustrated in FIG. 2B, blower 210 may be configured to receive ambient air as cool intake air. For example, blower 210, located within apparatus 100, may be configured to receive the ambient cool intake air through inlet vent 132 and internal ductwork of apparatus 100. In addition, blower 210 may be configured to blow the cool intake air into the information handling system through a first interface sealed by a first port and a second interface sealed by a second port. For example, blower 210 may be configured to blow the received cool intake air to information handling system 190 through interface 161 of second port 160 that is sealed by gasket 162, through interface 171 of third port 170 that is sealed by gasket 172, and through internal ductwork of apparatus 100.

As illustrated in FIG. 2B, blower 220 may be configured to receive warm exhaust air from the information handling system through a first interface sealed by a first port and through a second interface sealed by a second port. For example, blower 220 may be configured to receive warm exhaust air from the information handling system 190 through interface 161 of second port 160 that is sealed by gasket 162, through interface 171 of third port 170 that is sealed by gasket 172, and through internal ductwork of apparatus 100. In addition, blower 220 may be configured to blow the warm exhaust air out of apparatus 100. For example, blower 220, located within apparatus 100, may be configured to blow warm exhaust air through internal ductwork of apparatus 100 and out of apparatus 100 via outlet vent 134.

FIG. 2C is yet another block diagram illustrating functionality and some internal components of an apparatus for boosting performance of an information handling system according to some embodiments of the disclosure. In particular, FIG. 2C, like FIGS. 2A and 2B, illustrates ductwork within apparatus 100 according to some embodiments of the disclosure to configure the apparatus to receive and/or blow air from and/or to the various interfaces to an information handling system and/or to the ambient environment.

In the embodiment illustrated in FIG. 2C, blowers 210 and 220 may not be configured to blow air towards, or receive air from, interfaces to fans 230 and 240. Accordingly, as illustrated in FIG. 2C, no sealing elements may be located at the inlet or outlets of fans 230 and 240. Therefore, in some embodiments, fans 230 and 240 may be configured to receive ambient air as cool intake air to cool a CPU or GPU within information handling system 190 and to also blow warm exhaust air out of an information handling system 190 to the ambient environment. Accordingly, in some embodiments, apparatus 100 may be configured to allow ambient air to enter and exit the vent interfaces between fans 230 and 240 of information handling system 190 and the ambient environment. For example, an information handling system may include one or more vent interfaces that are open to the ambient environment. Apparatus 100 may be configured to not cover those vent interfaces or impede the free flow of ambient air into those vent interfaces such that ambient air is allowed to enter and exit those vent interfaces between fans 230 and 240 of information handling system 190 and the ambient environment without the air first having to enter first blower 210 or second blower 220. Accordingly, apparatus 100 may be configured to allow ambient air to enter and exit at least one vent of the information handling system 190 without first entering blower 210 or blower 220. For example, with reference to FIG. 1A, to effectuate such unimpeded airflow, apparatus 100 may be configured to include first portion 110 and not include second portion 150. In other words, in such an embodiment, apparatus 100 may be configured to include only first portion 110.

As illustrated in FIG. 2C, sealing element 252, which includes sealing elements 252A and 252B as described above with reference to FIG. 2A, may be included in the embodiment illustrated in FIG. 2C. Blower 210 may be configured to receive ambient air as cool intake air. For example, blower 210, located within apparatus 100, may be configured to receive the ambient cool intake air through inlet vent 132 and internal ductwork of apparatus 100. In addition, blower 210 may be configured to blow the cool intake air into the information handling system through the first interface sealed by the first port. For example, blower 210 may be configured to blow the received cool intake air to information handling system 190 through internal ductwork of apparatus 100 and through interface 121 of first port 120 that is sealed by gasket 122.

Figure 3:
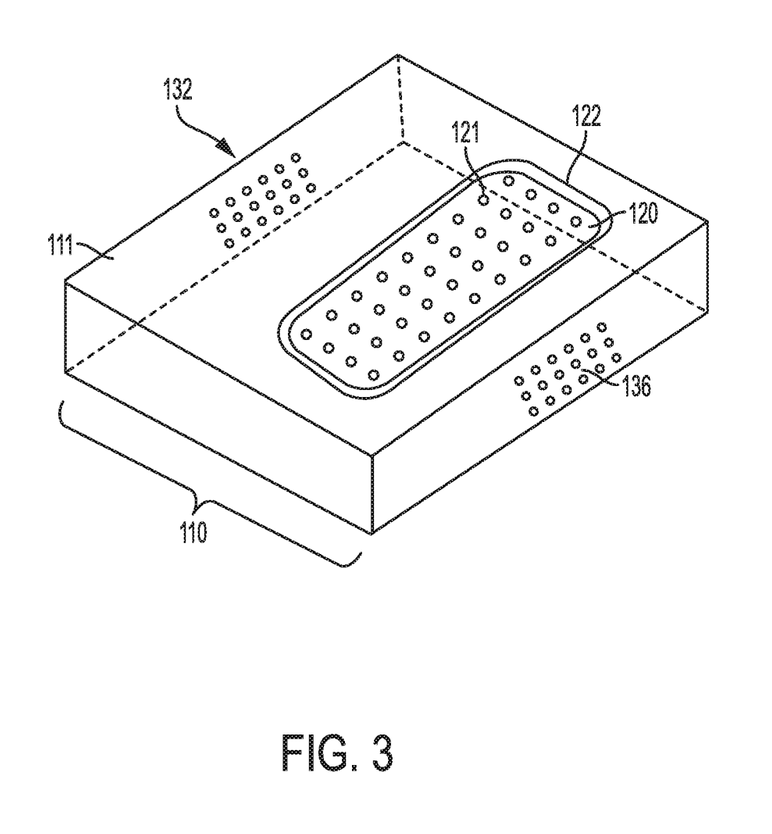
FIG. 3 is a perspective view of an apparatus for boosting performance of an information handling system according to some embodiments of the disclosure.

Blower 220 may be configured to receive warm exhaust air from the information handling system through the first interface sealed by the first port. For example, blower 220 may be configured to receive warm exhaust air from the information handling system 190 through interface 121 of first port 120 that is sealed by gasket 122 and through internal ductwork of apparatus 100. In addition, blower 220 may be configured to blow warm exhaust air out of apparatus 100. For example, blower 220, located within apparatus 100, may be configured to blow warm exhaust air through internal ductwork of apparatus 100 and out of apparatus 100 via an outlet in first portion 110 when apparatus 100 is configured to not include second portion 150. In some embodiments, the outlet may be located at a location of first portion 110 where the second portion typically would be located. In other words, second portion 150 may be replaced with an outlet such that apparatus 100 is configured to exhaust air through first portion 110 without needing second portion 150 that includes second port 160 and third portion 170. An example of apparatus 100 configured in accordance with the embodiment illustrated in FIG. 2C is provided in FIG. 3. That is, FIG. 3 is a schematic model illustrating an apparatus for boosting performance of an information handling system according to some embodiments of the disclosure. The outlet replacing second portion 150 is represented in FIG. 3 as outlet vent 136.

Figure 4:
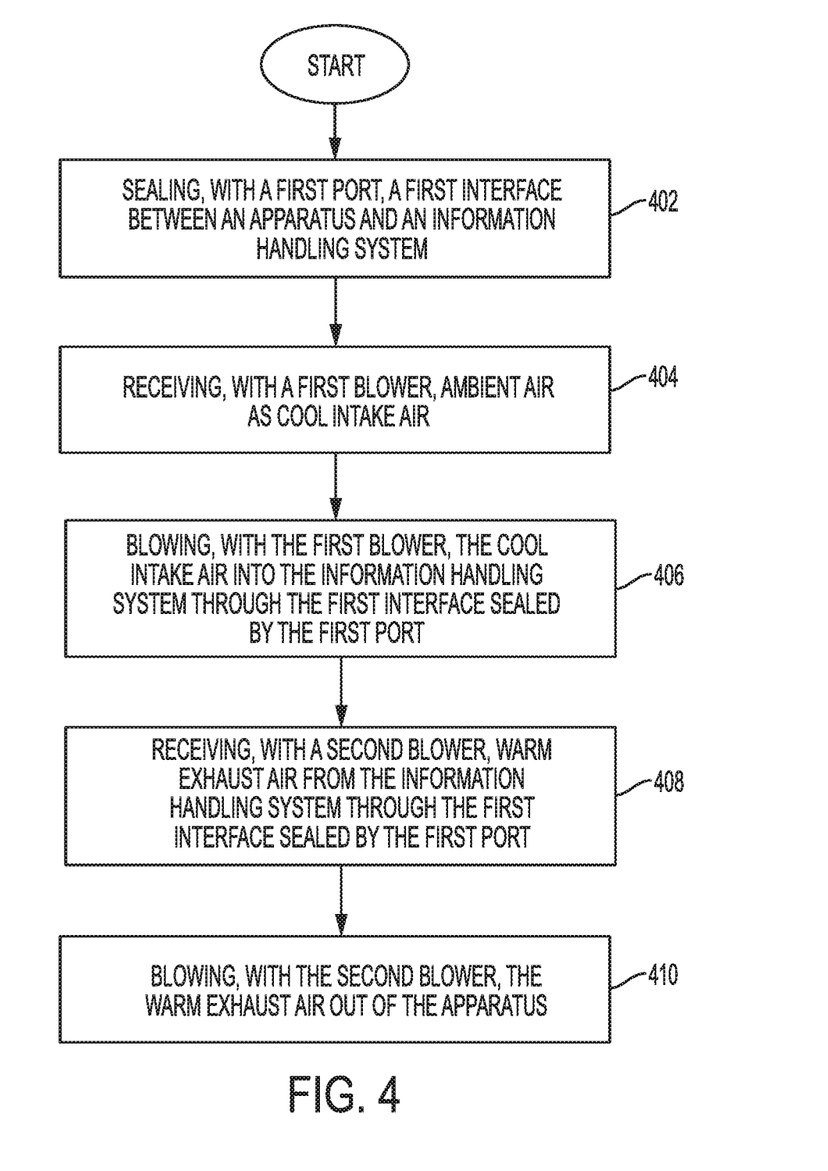
FIG. 4 is a flow chart illustrating an example method for boosting performance of an information handling system with an apparatus for boosting performance according to some embodiments of the disclosure.

FIG. 4 is a flow chart illustrating a method for boosting performance of an information handling system with an apparatus according to some embodiments of the disclosure. A method may be implemented with the apparatuses and systems described in this disclosure. The method begins, at block 402, with sealing, with a first port, a first interface between an apparatus and an information handling system. At block 404, the method includes receiving, with a first blower, ambient air as cool intake air. The method includes, at block 406, blowing, with the first blower, the cool intake air into the information handling system through the first interface sealed by the first port. At block 408, the method includes receiving, with a second blower, warm exhaust air from the information handling system through the first interface sealed by the first port. The method includes, at block 410, blowing, with the second blower, the warm exhaust air out of the apparatus. In other embodiments, the information handling system may have a first and a second interface. Bock 408 would include receiving, with the second blower, warm exhaust air from the information handling system through the second interface sealed by the second port.

Figure 5:
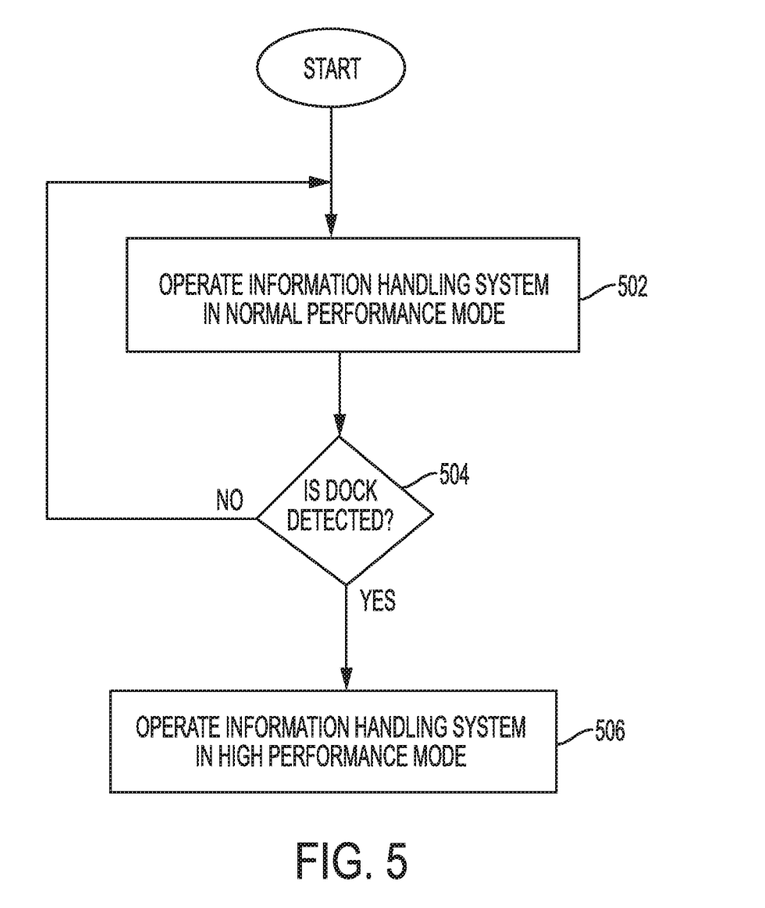
FIG. 5 is a flow chart illustrating an example method for operating an information handling system with an apparatus for boosting performance according to some embodiments of the disclosure.

As cooling is increased for an information handling system, the system may increase in performance by allowing components to consume more power. For example, CPU throttling may decrease when additional cooling is available. Some of the increase in performance may result from the improved cooling that occurs when the information handling system is attached to the dock without the system being aware of the dock's presence. In some embodiments, the information handling system may detect the attachment of the system to the dock and reconfigure the system for higher performance. A method for reconfiguring the information handling system for operation with the dock is described with reference to FIG. 5. FIG. 5 is a flow chart illustrating an example method for operating an information handling system with an apparatus for boosting performance according to some embodiments of the disclosure. A method 500 may begin at block 502 with operating the information handling system in a normal performance mode detached from the dock. Then, at block 504, the system may detect attachment to the dock to improve cooling of the information handling system. The detection at block 504 may be based on communication through a physical tag, such as an RFID tag, inserted in the dock, an electrical interface that couples the system to the dock, or a wireless interface such as Bluetooth that couples the system to the dock. The detection at block 504 may also be through sensors integrated in the ports. For example, the system may include a Hall sensor positioned near an intake vent that can detect the present of the dock. As another example, the system may include a pressure sensor or airflow detector that can detect when a blower is forcing air into the system's intake vent.

When the dock is detected at block 504, the information handling system may reconfigure at block 506 for operation in a high-performance mode. The reconfiguration may include, for example, increasing a throttle limit of the CPU, GPU, or other components, increasing a clock speed of the CPU, GPU, memory, or other components, activating a discrete GPU, modifying a configurable TDP (cTDP) or other programmable TDP of the CPU, GPU, or other component, or the like. In some embodiments, the reconfiguration may be performed by an embedded controller of the information handling system. In some embodiments, the reconfiguration may be performed through software executing on a CPU of the information handling system. When the information handling system detects that the dock is detached from the system, the system may return to normal performance mode of block 502, either immediately upon disconnect from the dock or by a gradual transition beginning at or shortly after the time of disconnect from the dock.

The schematic flow chart diagrams of FIG. 4 and FIG. 5 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by an information handling system may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software. If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although information handling systems are described throughout the detailed description, aspects of the invention may be applied to the design of or implemented on different kinds of information handling system processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), TV, server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

What is claimed is:

1. An apparatus, comprising:
    a first port configured to seal a first interface between the apparatus and an information handling system;
    a second port configured to seal a second interface between the apparatus and the information handling system;
    a first blower configured to:
        receive ambient air as cool intake air; and
        blow the cool intake air into the information handling system through the first interface sealed by the first port and the second interface sealed by the second port; and
    a second blower configured to:
        receive warm exhaust air from the information handling system through the first interface sealed by the first port and the second interface sealed by the second port, while the first blower is blowing the cool intake air into the information handling system through the first interface sealed by the first port; and
        blow the warm exhaust air out of the apparatus, while the first blower is blowing the cool intake air into the information handling system through the first interface sealed by the first port.

2. The apparatus of claim 1, wherein at least one of the first port and second port is located on a second surface of the apparatus configured to interface with a back surface of the information handling system.

3. The apparatus of claim 1, further comprising:
    a third port configured to seal a third interface between the apparatus and the information handling system,
    wherein the second blower is further configured to receive warm exhaust air from the information handling system through the third interface sealed by the third port.

4. The apparatus of claim 3, wherein at least one of the second port and third port is located on a second surface of the apparatus configured to interface with a back surface of the information handling system.

5. The apparatus of claim 3, wherein the apparatus is configured to allow ambient air to enter at least one vent of the information handling system without entering the first blower or the second blower.

6. The apparatus of claim 1, wherein the first port comprises a gasket made from a rubber or foam material.

7. The apparatus of claim 1, wherein the first port is located on a first surface of the apparatus configured to interface with a bottom surface of the information handling system.

8. The apparatus of claim 1, wherein the apparatus is configured to allow ambient air to enter and exit at least one vent of the information handling system without entering the first blower or the second blower.

9. A method, comprising:
    sealing, with a first port, a first interface between an apparatus and an information handling system;
    sealing, with a second port, a second interface between the apparatus and the information handling system;
    receiving, with a first blower, ambient air as cool intake air;
    blowing, with the first blower, the cool intake air into the information handling system through the first interface sealed by the first port and through the second interface sealed by the second port;
    receiving, with a second blower, warm exhaust air from the information handling system through the first interface sealed by the first port, while blowing, with the first blower, the cool intake air;
    receiving, with the second blower, warm exhaust air from the information handling system through the second interface sealed by the second port; and
    blowing, with the second blower, the warm exhaust air out of the apparatus, while blowing, with the first blower, the cool intake air.

10. The method of claim 9, further comprising:
    sealing, with a third port, a third interface between the apparatus and the information handling system; and
    receiving, with the second blower, warm exhaust air through the third interface sealed by the third port.

11. The method of claim 9, wherein the first port comprises a gasket made from a rubber or foam material.

12. An apparatus, comprising:
    a first port comprising a first gasket configured to seal a first interface between the apparatus and an information handling system;
    a second port comprising a second gasket configured to seal a second interface between the apparatus and the information handling system;
    a first blower configured to:
        receive ambient air as cool intake air; and
        blow the cool intake air into the information handling system through the first interface sealed by the first port and the second interface sealed by the second port; and a second blower configured to:
receive warm exhaust air from the information handling system through the first interface sealed by the first port and the second interface sealed by the second port; and
blow the warm exhaust air out of the apparatus,
wherein the second port connects an intake of the second blower to an output of a first internal fan of the information handling system.

13. The apparatus of claim 12, further comprising a third port comprising a third gasket configured to seal a third interface between the apparatus and the information handling system, wherein the first blower is further configured to blow the cool intake air into the information handling system through the third interface sealed by the third port.

14. The apparatus of claim 13, further comprising a fourth port comprising a fourth gasket configured to seal a fourth interface between the apparatus and the information handling system, wherein the second blower is further configured to receive warm exhaust air from the information handling system through the fourth interface sealed by the fourth port.

15. The apparatus of claim 14, wherein the first interface and the second interface are coupled through the information handling system to the third interface and the fourth interface, respectively.

16. The apparatus of claim 12, further comprising:
a third port comprising a third gasket configured to seal a third interface between the apparatus and the information handling system; and
a fourth port comprising a fourth gasket configured to seal a fourth interface between the apparatus and the information handling system,
wherein the second blower is configured to receive warm exhaust air from the information handling system through the third interface and the fourth interface sealed by the third port and the fourth port, respectively.

17. The apparatus of claim 16, wherein at least one of the second port and third port is located on a second surface of the apparatus configured to interface with a back surface of the information handling system.

18. The apparatus of claim 12, wherein at least one of the first port and second port is located on a second surface of the apparatus configured to interface with a back surface of the information handling system.

19. The apparatus of claim 12, wherein the apparatus is configured to allow ambient air to enter at least one vent of the information handling system without entering the first blower or the second blower.

20. The apparatus of claim 12, wherein the first gasket is made from a rubber or foam material.

* * * * *